US 6,701,021 B1

United States Patent
Qian et al.

(10) Patent No.: US 6,701,021 B1
(45) Date of Patent: Mar. 2, 2004

(54) SYSTEM AND METHOD FOR ENCODING/ DECODING MULTIDIMENSIONAL DATA USING SUCCESSIVE APPROXIMATION MULTI-STAGE VECTOR QUANTIZATION

(75) Inventors: Shen-En Qian, Brossard (CA); Allan B. Hollinger, Toronto (CA)

(73) Assignee: Canadian Space Agency, Saint-Hubert (CA)

( * ) Notice: Subject to any disclaimer, the term of this patent is extended or adjusted under 35 U.S.C. 154(b) by 535 days.

(21) Appl. No.: 09/717,220

(22) Filed: Nov. 22, 2000

(51) Int. Cl.[7] .............................................. G06K 9/456
(52) U.S. Cl. ..................... 382/253; 382/233; 382/235; 382/243; 358/539; 358/426.04; 375/240.03; 375/240.22
(58) Field of Search ................................ 382/217, 218, 382/219, 220, 226, 235, 239, 243, 240, 244, 246, 249, 251, 252, 253, 278, 166, 233; 358/534, 26.03, 426.04, 426.06, 426.07, 463; 375/240.03, 240.16, 240.22, 240.23, 240.24, 294; 345/733, 734, 737, 739, 751; 707/101

(56) References Cited

U.S. PATENT DOCUMENTS

| | | | | |
|---|---|---|---|---|
| 4,670,851 A | * | 6/1987 | Murakami et al. | 378/121 |
| 4,862,261 A | * | 8/1989 | Tanaka | 348/422.1 |
| 5,398,069 A | * | 3/1995 | Huang et al. | 375/240.22 |
| 5,784,491 A | * | 7/1998 | Koga | 382/232 |
| 5,822,457 A | * | 10/1998 | Yeh | 382/232 |
| 6,167,156 A | * | 12/2000 | Antoniades et al. | 382/232 |
| 6,546,146 B1 | * | 4/2003 | Hollinger et al. | 382/253 |

OTHER PUBLICATIONS

Ryan, Michael J. and Arnold, John F., "Lossy Compression of Hyperspectral Data Using Vector Quantization," *Remote Sens. Environ.*, Elsevier Science Inc., New York, N.Y., 1997, vol. 61, pp. 419–436.

* cited by examiner

*Primary Examiner*—Bhavesh M. Mehta
*Assistant Examiner*—Yosef Kassa
(74) *Attorney, Agent, or Firm*—Freedman & Associates

(57) ABSTRACT

The present method relates to a method for encoding image data using vector quantization. According to the invention, a small first codebook is determined. Each image vector of the image data is then encoded by determining a codevector within the first codebook that best approximates the image vector within the image data. A first index map is generated by replacing each image vector with an index indicative of the codevector's location within the first codebook. Then difference data are evaluated based on the original image data and the encoded image data. Each error vector of the difference data is then encoded using another small codebook. In another index map the error vectors are then replaced with an index indicative of the codevector's location within the other codebook. Evaluation of the error based on the difference data and the encoded difference data provides new difference data which is used to evaluate the fidelity of the approximation process performed for compression. The steps of encoding of the difference data are repeated until a control error of the difference data is smaller than a given threshold.

45 Claims, 7 Drawing Sheets

SYSTEM AND METHOD FOR ENCODING/ DECODING MULTIDIMENSIONAL DATA USING SUCCESSIVE APPROXIMATION MULTI-STAGE VECTOR QUANTIZATION

FIELD OF THE INVENTION

This invention relates to data compression and in particular to multidimensional data representations using vector quantisation.

BACKGROUND OF THE INVENTION

The next generation of satellite-based remote sensing instruments will produce an unprecedented volume of data. Imaging spectrometers, also known as hyper-spectral imaging devices, are prime examples. They collect image data in hundreds of spectral bands simultaneously from the near ultraviolet to the short wave infrared, and are capable of providing direct identification of surface materials.

Hyper-spectral data thus collected are typically in the form of a three-dimensional (3D) data cube. Each data cube has two dimensions in the spatial domain defining a rectangular plane of image pixels, and a third dimension in the spectral domain defining radiance levels of multiple spectral bands per each image pixel. The volume and complexity of hyper-spectral data present a significant challenge to conventional transmission and image analysis methods. The raw data rates for transmitting such data cubes can easily exceed the available downlink capacity or on-board storage capacity of existing satellite systems. Often, therefore, a portion of the data collected on board is discarded before transmission, by reducing the duty cycle, reducing the spatial or spectral resolution, and/or reducing the spatial or spectral range. Obviously, in such cases large amounts of information are lost.

For data processing, a similar problem occurs. In computing, a current trend is toward desktop computers and Internet based communications. Unfortunately, the data cubes require a tremendous amount of storage and, for processing, the storage is preferably random access memory (RAM). Current desktop computers often lack sufficient resources for data processing of data cubes comprising spectral data.

Recent work related to data compression of multi-spectral and hyper-spectral imagery has been reported in the literature, but most of these studies relate to multi-spectral imagery comprised of only a few spectral bands. These prior art systems for multi-spectral imagery yield small compression ratios, usually smaller than 30:1. There are two reasons for this:

1) the prior art systems do not efficiently remove the correlation in the spectral domain, and
2) the redundancy of multi-spectral imagery in the spectral domain is relatively small compared to that of hyper-spectral imagery.

Gen et al. teach two systems for hyper-spectral imagery. The first system uses trellis coded quantisation to encode transform coefficients resulting from the application of an 8×8×8 discrete cosine transform. The second system uses differential pulse code modulation to spectrally decorrelate data, while using a 2D discrete cosine transform for spatial decorrelation. These two systems are known to achieve compression ratios of greater than 70:1 in some instance; however, it is desirable to have higher compression ratios with simpler coding structures than those reported in the literature.

In an article entitled "Lossy Compression of Hyperspectral Data Using Vector Quantization" by Michael Ryan and John Arnold in the journal *Remote Sens. Environ.*, Elsevier Science Inc., New York, N.Y., 1997, Vol. 61, pp. 419–436, an overview of general vector quantization techniques as are now known is presented. The article is herein incorporated by reference. In particular, the authors describe issues such as distortion measures and classification issues arising from lossy compression of hyper-spectral data using vector quantization.

Data compression using Vector Quantisation (VQ) has received much attention because of its promise of high compression ratio and relatively simple structure. Unlike scalar quantisation, VQ requires segmentation of the source data into vectors. Commonly, in two-dimensional (2D) image data compression, a block with n×m (n may be equal to m) pixels is taken as a vector, whose length is equal to n×m. Vectors constituted in this way have no physical analogue. Because the blocks are segmented according to row and column indices of an image, the vectors obtained in this manner change at random as the pixel patterns change from block to block. The reconstructed image shows an explicit blocking effect for large compression ratios.

There are several conventional approaches to constituting vectors in a 3D data cube of hyper-spectral imagery. The simplest approach is to treat the 3D data cube as a set of 2D monochromatic images, and segment each monochromatic image into vectors independently as in the 2D-image case. This approach, however, suffers from not taking advantage of the high correlation of data in the spectral domain. There is therefore a need for a data compression system that takes advantage of correlation in the spectral domain and the 2D spatial correlation between adjacent image pixels.

The VQ procedure is known to have two main steps: codebook generation and codevector matching. VQ can be viewed as mapping a large set of vectors into a small cluster of indexed codevectors forming a codebook. During encoding, a search through a codebook is performed to find a best codevector to express each input vector. The index or address of the selected codevector in the codebook is stored associated with the input vector or the input vector location. Given two systems having a same codebook, transmission of the index to a decoder over a communication channel from the first system to the second other system allows a decoder within the second other system to retrieve the same codevector from an identical codebook. This is a reconstructed approximation of the corresponding input vector. Compression is thus obtained by transmitting the index of the codevector rather the codevector itself. Many existing algorithms for codebook designs are available, such as the LBG algorithm reported by Linde, Buzo and Gray, the tree-structure codebook algorithm reported by Gray, the self organising feature map reported by Nasrabadi and Feng. Among these, the LBG algorithm is most widely used because of its fidelity. The disadvantages of the LGB algorithm are its complexity and the time burden taken to form the codebook. When the input data is a 3D data cube of hyper-spectral imagery, the processing time can be hundreds of times higher than the normal 2D-image case.

It is, therefore, an object of the invention to provide a substantially faster method of compression with a relatively high fidelity for encoding multidimensional data.

It is further an object of the invention to provide a method of encoding multidimensional data in a plurality of approximation stages.

SUMMARY OF THE INVENTION

In accordance with the invention there is provided, a method for encoding image data using vector quantisation, wherein the encoded image data is compressed data, the method comprising the steps of:
  a) determining a first codebook having a plurality of codevectors;
  b) encoding each image vector of the image data by determining a codevector within the first codebook that approximates the image vector within the image data;
  c) creating a first index map by replacing each image vector with an index indicative of the codevector's location within the first codebook;
  d) determining difference data based on the original image data and the encoded image data; and,
  e) repeating the steps of:
    e2) determining another codebook;
    e2) encoding each error vector of the difference data by determining a codevector within the other codebook that approximates the error vector within the difference data;
    e3) creating another index map by replacing each error vector with an index indicative of the codevector's location within the other codebook; and,
    e4) determining new difference data based on the difference data and the encoded difference data;
  until a control error of the difference data is smaller than a given threshold.

In accordance with another aspect of the invention there is provided, a method for transmitting encoded image data via a communications network, wherein the encoded image data is compressed data, the method comprising the steps of:
  a) receiving from a first station connected to the communications network first data indicative of a first codebook and a first index map;
  b) transmitting the first data via the communications network from the first station to a second station; and,
  c) repeating the steps of:
    c1) receiving data indicative of a consecutive codebook and a consecutive index map; and,
    c2) transmitting the data via the communications network from the first station to the second station;
  until a fidelity of an image reconstructed from the transmitted data at the second station is above a predetermined threshold or until all codebooks and all index maps of the encoded image data have been transmitted.

In accordance with yet another aspect of the invention there is provided, a method for decoding encoded image data, wherein the encoded image data is compressed data, the method comprising the steps of:
  a) decoding each encoded image vector of the image data using a first codebook and a first index map;
  b) reconstructing first image data based on the decoded image vectors; and,
  c) repeating the steps of:
    c1) decoding each encoded error vector of consecutive difference data using a consecutive codebook and a consecutive index map; and,
    c2) reconstructing image data based on the first image data and the decoded error vectors of consecutive difference data;
  until a fidelity of the reconstructed image data is above a predetermined threshold or until all codebooks and all index maps of the encoded image data have been decoded.

In accordance with the invention there is further provided, a system for encoding image data using vector quantisation, wherein the encoded image data is compressed data, the system comprising:
  a first port for receiving the image data;
  a processor for:
    a) determining a first codebook having a plurality of codevectors;
    b) encoding each image vector of the image data by determining a codevector within the first codebook that approximates the image vector within the image data;
    c) creating a first index map by replacing each image vector with an index indicative of the codevector's location within the first codebook;
    d) determining difference data based on the original image data and the encoded image data; and,
    e) repeating the steps of:
      e1) determining another codebook;
      e2) encoding each error vector of the difference data by determining a codevector within the other codebook that approximates the error vector within the difference data;
      e3) creating another index map by replacing each error vector with an index indicative of the codevector's location within the other codebook; and,
      e4) determining new difference data based on the difference data and the encoded difference data;
    until a control error of the difference data is smaller than a given threshold; memory for storing data during execution of steps a) to e4); and, a second port for providing the encoded image data.

In accordance with the invention there is yet further provided, a system for decoding encoded image data, wherein the encoded image data is compressed data, the system comprising:
  a first port for receiving the encoded image data;
  a processor for:
    a) decoding each encoded image vector of the image data using a first codebook and a first index map;
    b) reconstructing first image data based on the decoded image vectors; and,
    c) repeating the steps of:
      c1) decoding each encoded error vector of consecutive difference data using a consecutive codebook and a consecutive index map; and,
      c2) reconstructing image data based on the first image data and the decoded error vectors of consecutive difference data;
    until a fidelity of the reconstructed image data is above a predetermined threshold or until all codebooks and all index maps of the encoded image data have been decoded;
  memory for storing data during execution of steps a) to c2); and, a second port for providing the decoded image data.

BRIEF DESCRIPTION OF THE DRAWINGS

Exemplary embodiments of the invention will now be described in conjunction with the drawings, in which.

DETAILED DESCRIPTION OF THE INVENTION

In spectral imaging using satellite based hyperspectral imagers, there is a tremendous amount of data captured that requires transmission to a terrestrial base for analysis and other uses. Typically, it is desirable to compress the captured data before transmitting same to the ground. Unfortunately, this often requires complex and expensive compression hardware. Using the method of the present invention, it is possible to implement a fast data encoding system using commonly available processors that operates in real-time and is suitable to installation on board a satellite system.

Figure 1:
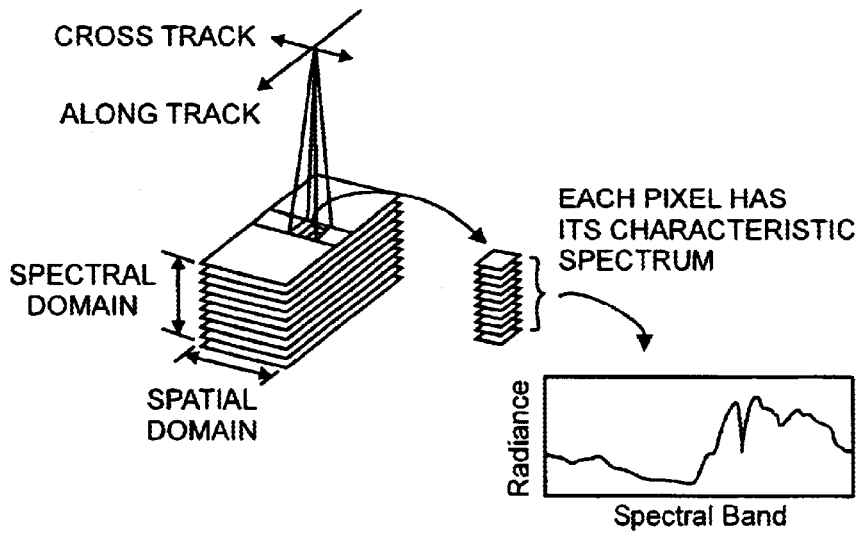
FIG. 1 is a perspective view of a hyper-spectral data cube having two dimensions in the spatial domain defining a rectangular plane of image pixels, and a third dimension in the spectral domain defining radiance levels of multiple spectral bands per each image pixel.
Figure 2:
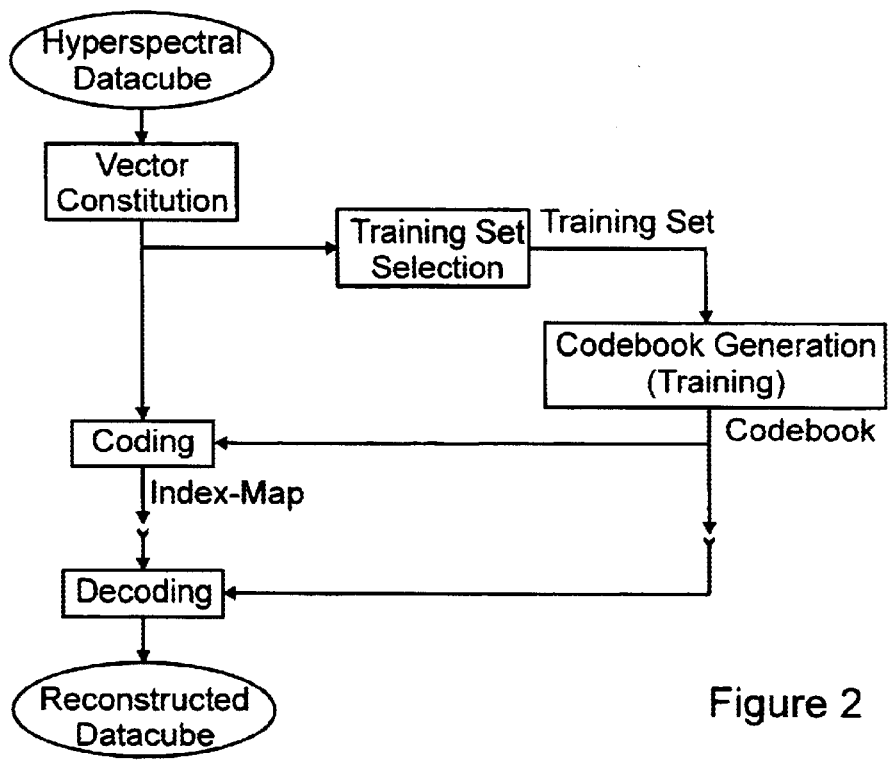
FIG. 2 is a simplified block diagram of a prior art embodiment of a system for compressing, communicating and processing in a compressed form, hyper-spectral image data defining radiance levels of multiple spectral bands per image pixel, said system being initially trained with image data defining a predetermined set of training image pixels.

Referring now to FIG. 1, a hyper-spectral data cube is shown. The data is a set of spectral data captured from a satellite. As such, there is a strong correlation between spectra of similar items such as snow or water. For example, spectra relating to locations wherein snow is found are often similar, but not identical. Encoding of these data in order to compress them can be performed using a vector quantisation (VQ) method. Referring to FIG. 2, a simplified flow diagram of a prior art method of performing vector quantisation is shown. A codebook is generated from a hyper-spectral datacube having a known number of codevectors. Generation of a codebook is a time-consuming and difficult task since the ability of the codevectors within the codebook to approximate each vector in the datacube is essential in order to provide a good fidelity—minimal error. Thus, a set of codevectors within the codebook is selected and compared against vectors in the datacube to ensure that they "best" approximate each vector in some fashion.

Once the codebook is generated, the vectors within the datacube are encoded by replacing each vector with an index of the best matching codevector within the codebook. For example, when a datacube has 1,000,000 vectors and a codebook has 256 codevectors, the resulting compressed data requires memory for 256 vectors being the codebook and 1,000,000 bytes forming the entire array of indices. Even if the codevectors have 100 bytes each, the resulting encoded data requires just over a megabyte while the original data required 100 megabytes. However, though the compression ratio is high, the fidelity may be poor since the compression is lossy. Further, different codebooks will result in different—better or worse—fidelity as noted above.

Figure 3:
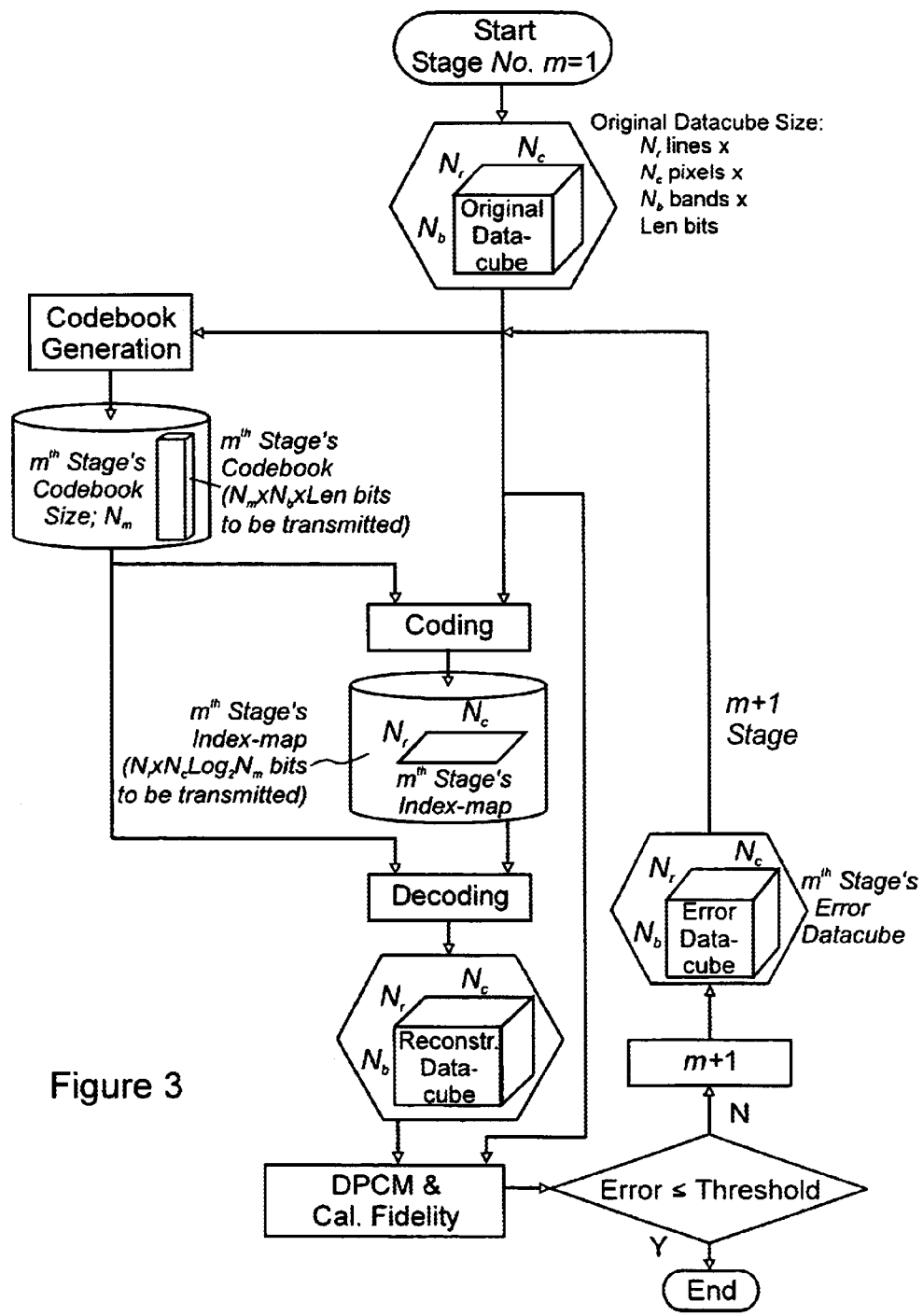
FIG. 3 is a flow diagram of a preferred embodiment of a method for encoding image data according to the invention.
Figure 4:
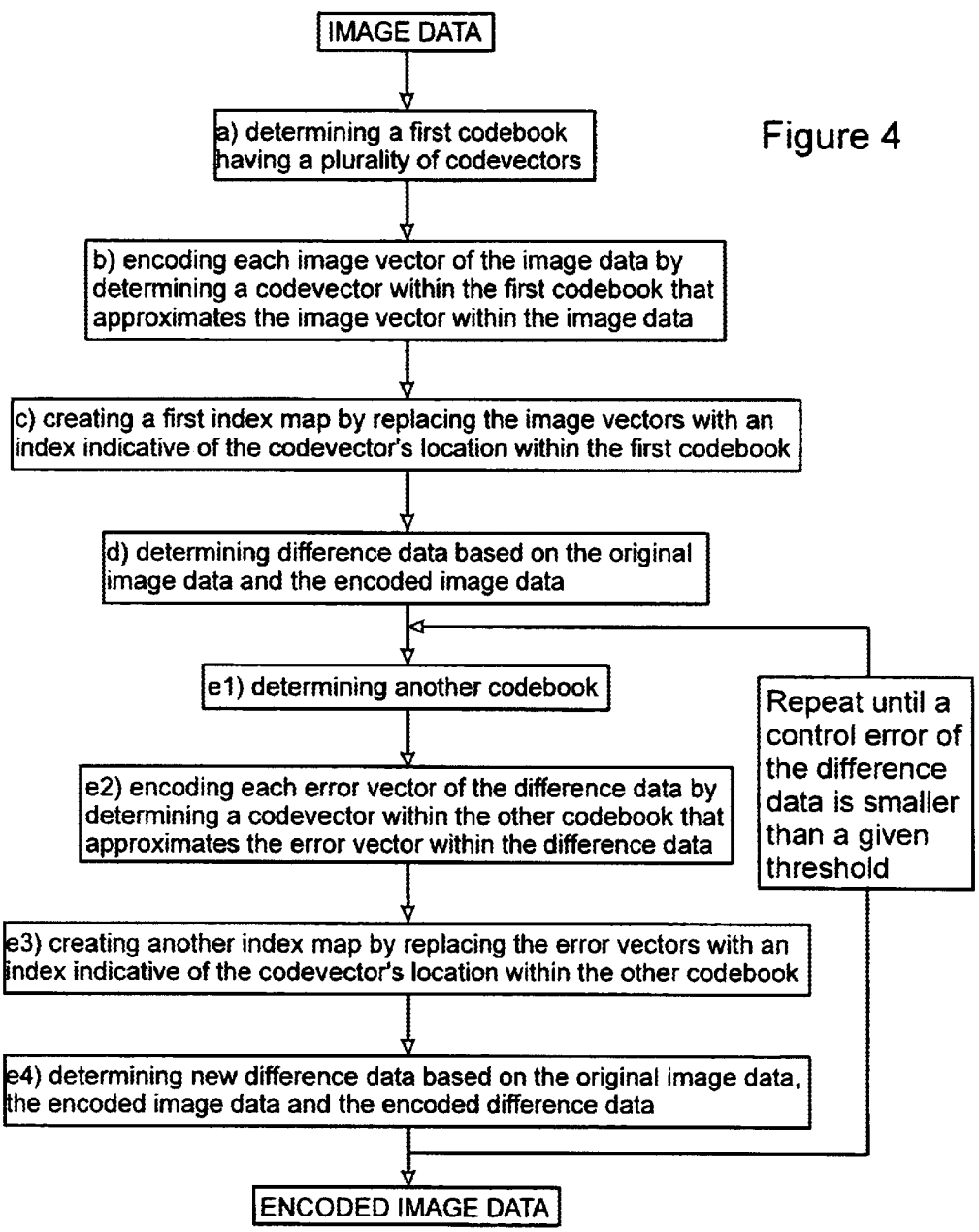
FIG. 4 is a simplified diagram of the method shown in FIG. 3.
Figure 5:
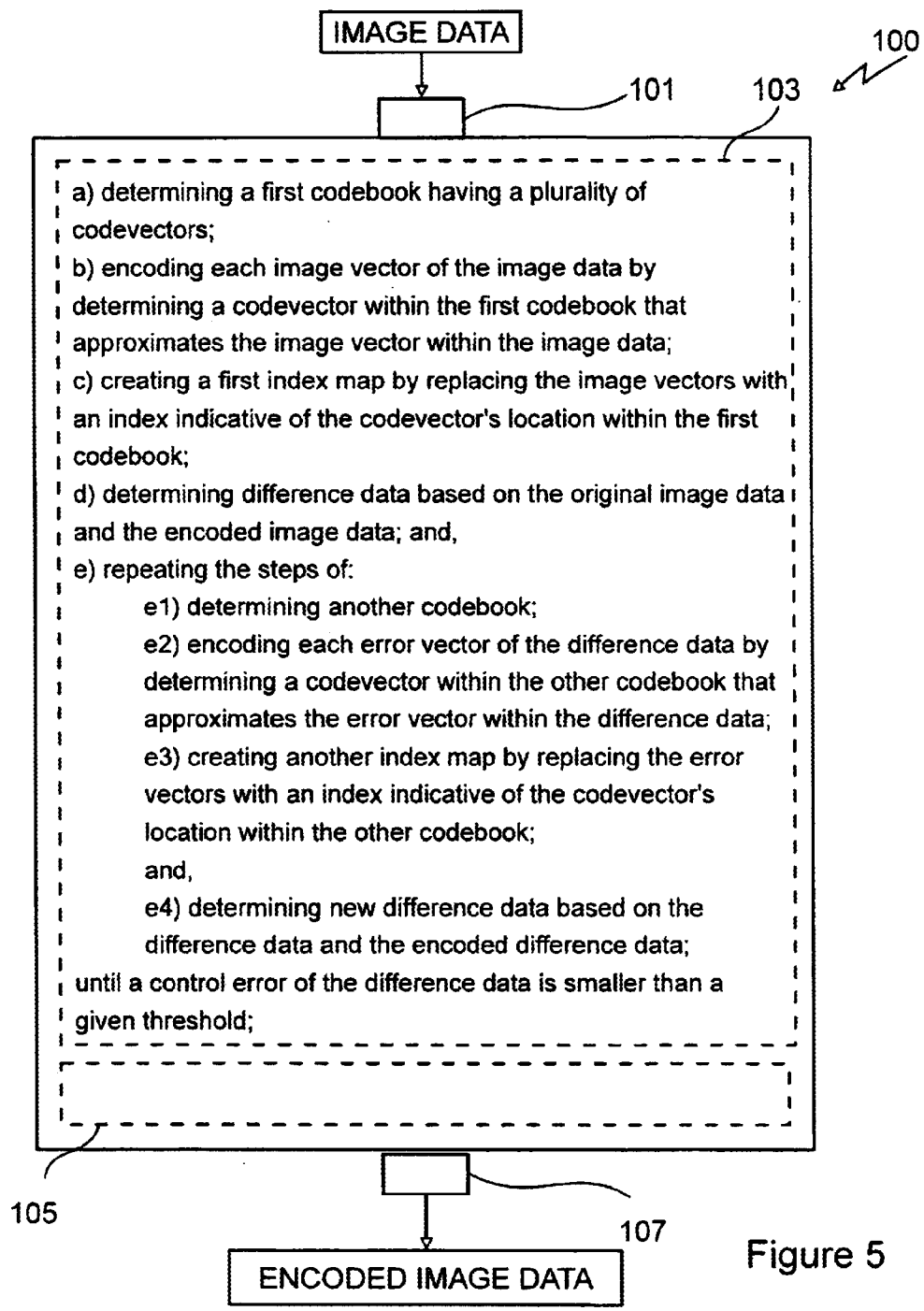
FIG. 5 is simplified diagram of a system for encoding image data according to the invention.

In order to overcome the shortcomings of the above method a Successive Approximation Multi-stage Vector Quantisation (SAMVQ) method for encoding multidimensional data is disclosed. Throughout the specification and claims the term image data is defined to mean any multidimensional data. Referring to FIGS. 3, 4 and 5, a system 100 and a method for encoding hyper-spectral data according to the invention is shown. The original image data is provided via port 101 as input to processor 103 for successive approximation multi-stage processing as shown in FIGS. 3 and 4. Memory 105, preferably RAM, is provided to store data during the processing. Encoded data are then provided to port 107 connected to a communications network.

In a first approximation stage, a first codebook having a small number of codevectors is generated from the original image data. A codevector in the codebook corresponds to a cluster of image vectors and is the gravity center of the cluster. The codebook typically has less than 16 codevectors. Selection of such a codebook to accurately reflect the vectors of a given datacube is unlikely and as such, less care needs to be taken to ensure high fidelity of the results. Optionally, sampling is performed on a small percentage of image vectors within the image data and a set of codevectors is determined for reasonably approximating the sampled vectors. Next, the image vectors of the image data are encoded using the small first codebook by determining a codevector within the first codebook that approximates the image vector within the image data, and preferably that best approximates the image vector. Generation of a first index map replaces each image vector with an index indicative of the codevector's location within the first codebook. As is evident, encoding the image data with a small codebook will result in encoded data having a low fidelity. In preparation of a following approximation stage difference based on the original image data and the encoded image data are determined. The difference data is obtained as a difference between the original image data and reconstructed image data after some form of decoding. The difference data become input data for a subsequent approximation stage. In the second subsequent approximation stage a new approximation is created by generating a new small codebook and encoding each error vector of the difference data by determining a codevector within the new small codebook that approximates the error vector within the difference data. A second index map is created by replacing the error vectors with an index indicative of the codevector's location within the new small codebook. New difference data based on the original image data, the encoded image data and the encoded difference data are then determined. Of course, given an accurate representation of the difference data of a previous iteration allows a simple comparison between the actual error and the encoded value for the error to determine the new difference data. The approximation stages comprising the encoding of the difference data is continued until a control error of the difference data is smaller than a given threshold.

Optionally, sampling is performed on a small percentage of image vectors within the original image data and a set of codevectors is determined for reasonably approximating the sampled vectors. Further optionally, sampling is also performed on the error vectors for reasonably approximating the error vectors. Accurate sampling may result in a substantial reduction of the number of approximation stages and/or sizes of the codebooks.

The compression ratio of the SAMVQ method according to the invention with m-stage approximation of a hyper-spectral datacube is expressed as:

$$C_r = \frac{N_r \cdot N_c \cdot N_b \cdot Len}{\sum_{m=1}^{M} (N_m \cdot N_b \cdot Le + N_r \cdot N_c \cdot log_2 / V_m)},$$

where $N_r$ and $N_c$ is the number of lines and the number of pixels in the scene of the hyper-spectral datacube, $N_b$ is the number of spectral bands, Len is the word-length of data value, $N_m$ is the size of the codebook at stage m and M is the number of approximation stages.

Codebook Generation Time (CGT) is much faster than with conventional vector quantisation methods, since the codebook at each approximation stage is much smaller. To generate a codebook for a given datacube, the CGT is proportional to the size of the codebook. In conventional vector quantisation methods a single codebook of size N is generated. The CGT is proportional to N:

$$CGT_{(3DVQ)} \propto N,$$

whereas for the SAMVQ method according to the invention the CGT is proportional to the cumulative sum of the sizes of the codebooks generated at each approximation stage:

$$CGT_{(SAMVQ)} \propto N' = \sum_{m=1}^{M} N_m,$$

where $N_m$ is the size of the codebook for the $m^{th}$ stage. In general, $N_m \ll N$. Since Coding Time (CT) and decoding time are also proportional to the codebook size the coding and the decoding are much faster for the SAMVQ method than conventional vector quantisation methods. This improvement in processing speed has no fidelity penalty, because the SAMVQ method spans the data with a virtual codebook proportional to the product of the sizes of the codebooks generated at each approximation stage. Therefor, the size of the virtual codebook is:

$$\prod_{m=1}^{M} N_m.$$

For example, assume that the SAMVQ method comprises a 4 stage approximation with codebooks having identical size of 8 codevectors at each stage. Then the virtual codebook—the equivalent codebook for conventional vector quantisation methods—would have $N=8^4=4096$ codevectors to achieve the same reconstruction fidelity as the SAMVQ method having only $N=4\times8$ codevectors. Both the CGT and the CT are improved by a factor of $$\frac{N}{N'} = \frac{8^4}{4 \times 8} = 128.$$

By varying the size of the codebook used at each approximation stage and the number of approximation stages the compression ratio of the encoding as well as the fidelity of the reconstructed data is controllable. Therefore, the SAMVQ method according to the invention is highly advantageous for various applications.

The set of codebooks and index maps of the multiple approximation stages is easily combined into a single codebook and a single index map similar to those obtained from conventional vector quantasation methods. For example a single index map is optionally constructed by concatenating the indices indicating a same spatial location in the index maps allowing fast calculation of a corresponding combined codevector for decoding.

The compression ratio obtained by the SAMVQ method is optionally further improved without affecting fidelity by entropy encoding of the codebook and the index map at each approximation stage. The amplitude of the codevectors decreases with increasing number of approximation stages. For example, the amplitude of each codevector after the second approximation stage may occupy only the least 4 bits. Using entropy encoding the codevectors after stage two are expressed using only the lowest order 4 bits instead of the usual word length Len of 16 bits.

Another highly advantageous feature of the SAMVQ method is the creation of encoded data—codebook and index map—in subsequent approximation stages. This allows encoding, transmission and decoding of same original image data in stages of increasing reconstruction fidelity. For example, the most significant image information is encoded, transmitted and decoded first followed subsequently by lesser significant image information.

Furthermore, if the number of codevectors in the first codebook is determined such that it is close to the number of real classes present in the image data comprising a hyper-spectral datacube then the first index map provides spatial information and spectral classification information of the hyper-spectral datacube.

Figure 6:
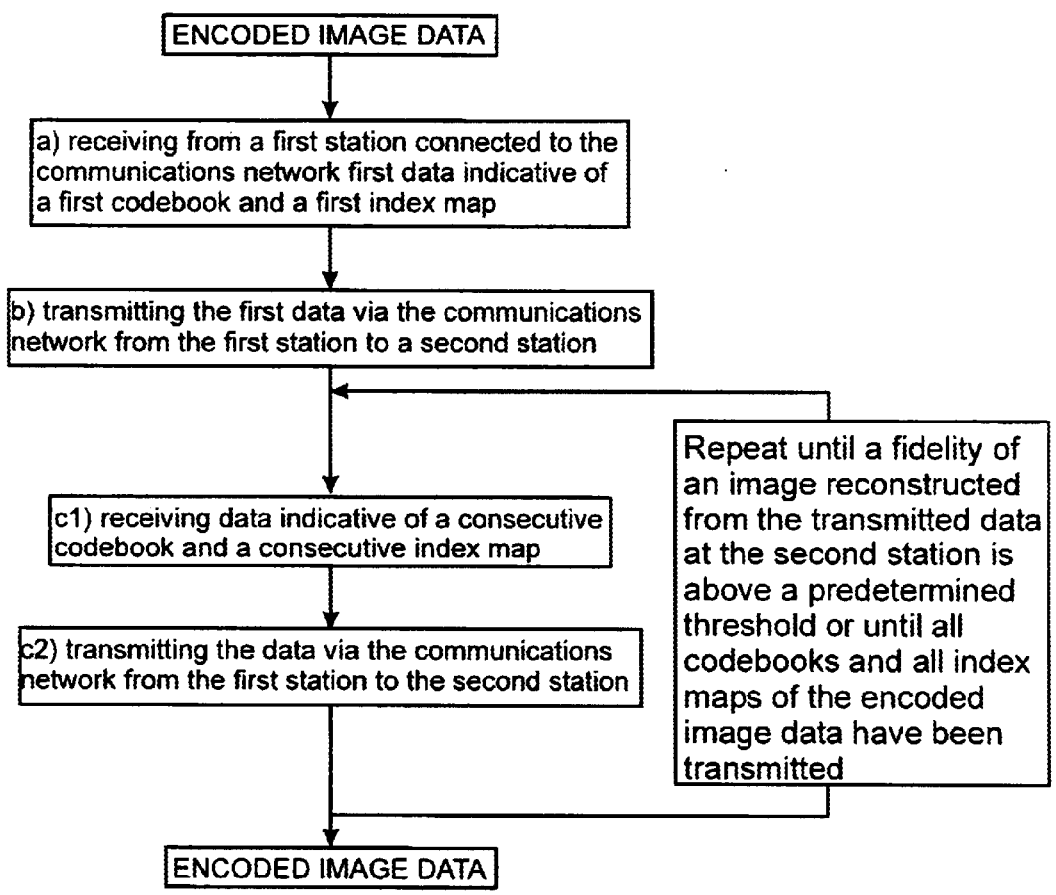
FIG. 6 is a simplified diagram of a method for transmitting encoded image data according to the invention.
Figure 7:
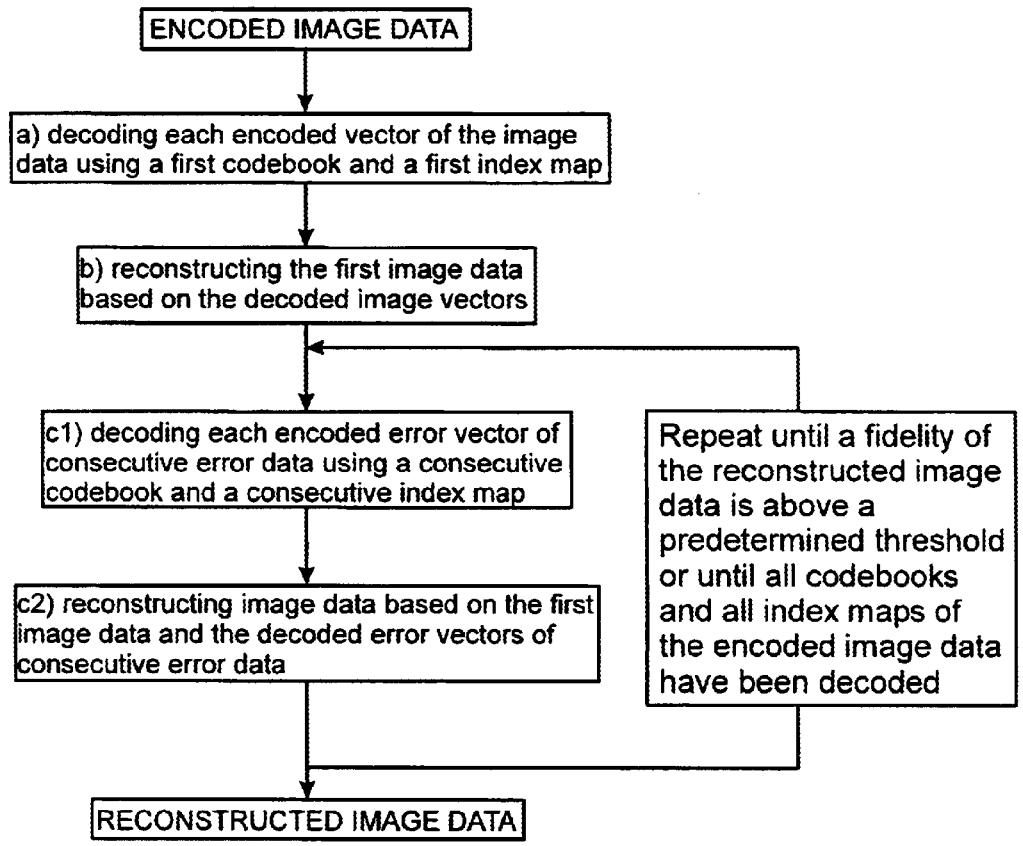
FIG. 7 is a simplified diagram of a method for decoding encoded image data according to the invention; and, FIG. 8 is simplified diagram of a system for decoding encoded image data according to the invention.
Figure 8:
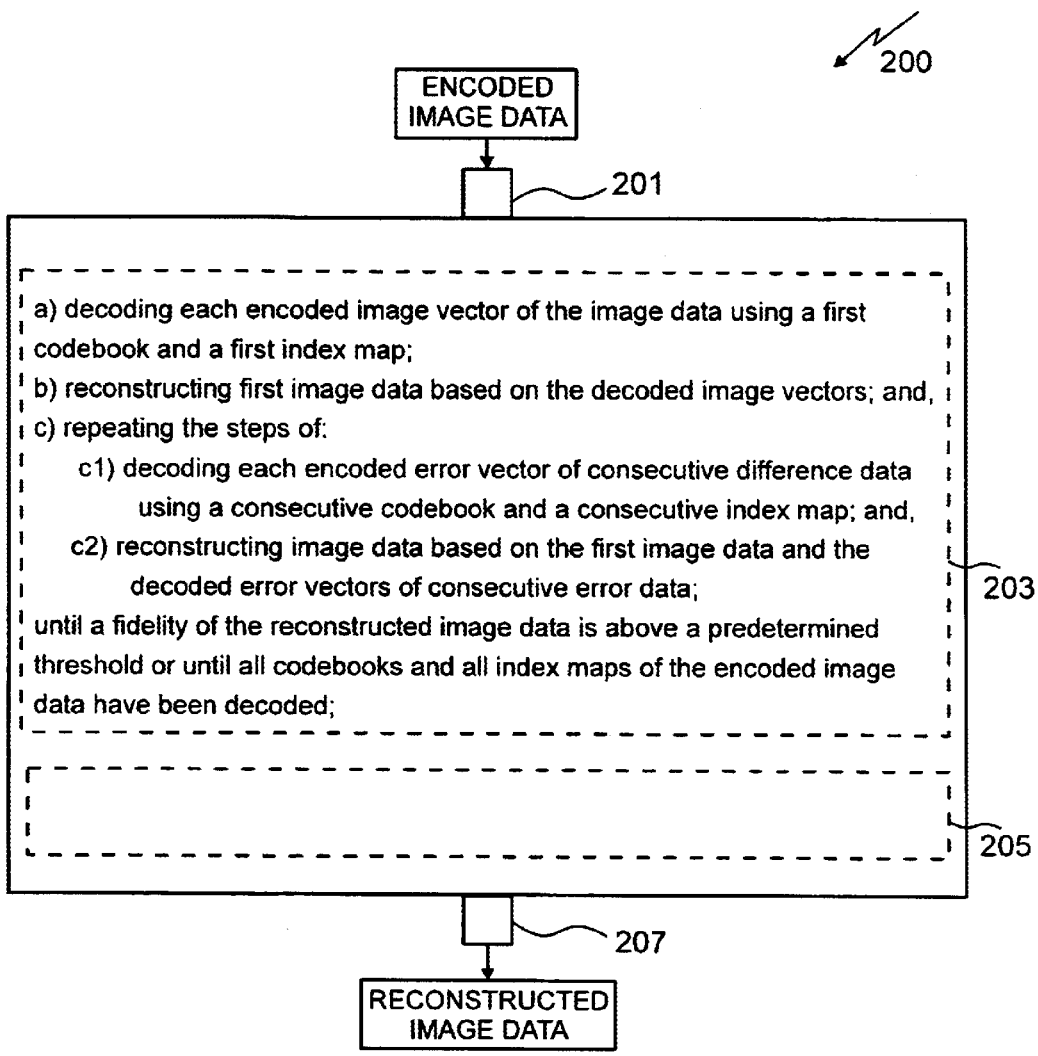

Referring to FIGS. 6 and 7 flow charts are shown outlining a very elegant method for transmission and decoding according to the invention. FIG. 8 is a simplified diagram of a system for decoding compressed data according to the invention. Data indicative of a first codebook and a first index map are received from a first station connected to a communications network and transmitted to a second station connected to the communications network. Codebooks and index maps created in each of subsequent approximation steps are then transmitted subsequently. The transmission is terminated when all codebooks and all index maps of the encoded image data have been transmitted. Alternatively, the second station may terminate transmission if an image reconstructed from the transmitted data has fidelity above a predetermined threshold, which is less than the threshold of the encoded data at the first station. Further alternatively, the first station may terminate the transmission if image data of only lesser fidelity should be provided to the second station. Preferably, the most significant image information is transmitted first.

The encoded data are received from a communications network at port 201 of system 200 as input to processor 203 for multi-stage decoding as shown in FIGS. 7 and 8. Memory 205, preferably RAM, is provided to store data during the processing. Decoded and reconstructed image data are then provided to port 207. The received data are decoded in a first stage based on data indicative of a first codebook and a first index map providing decoded image vectors. In successive stages each encoded error vector of consecutive difference data is decoded using a consecutive codebook and a consecutive index map. Image data of increasing fidelity are then consecutively reconstructed based on consecutive error vectors of successive approximation stages. The successive stages of decoding are continued until fidelity of the reconstructed image data is above a predetermined threshold or until all codebooks and index maps have been decoded.

The SAMVQ method for encoding and its embodiments for transmission and decoding are highly advantageous for applications in air- and spacecraft, for example, for earth observation. In particular, the unique features of this method—successive stages of approximation and speed—allow the application of compression technology in real time on board an air—or spacecraft. Creation of encoded data—codebook and index map—in subsequent approximation stages allows encoding, transmission and decoding in real time of same original image data in stages of increasing reconstruction fidelity with the most significant image information being encoded, transmitted and decoded first, followed subsequently by lesser significant image information. For example, this allows termination of transmission of data if a reconstructed image has sufficient fidelity, freeing precious bandwidth for transmission of other data.

Another application of this highly advantageous method is the provision of image data—pictures, videos etc.—from a provider to a client via a communications network such as the Internet. The client receives compressed image data of low fidelity, for example, a first codebook and a first index map for viewing. After the client made a selection he contacts the provider to order image data he has selected. The provider then supplies data indicative of codebooks and index maps of successive approximation stages of the selected image data in order to reconstruct image data of higher fidelity.

Though in the above description, the exact method of determining codevectors within a codebook is not disclosed, there are many such methods in the prior art. Any such method is applicable to the present invention. Preferably, such a method is applied in a more time efficient fashion that risks fidelity in order to improve performance. Since fidelity will be improved in further stages, the fidelity of each individual stage is less significant than with the prior art.

For example, a method of fast vector quantisation involves a step of training set sub-sampling. Such a method, when integrated into the present inventive method, results in significant advantages. It is generally known that to generate a given size codebook the Codebook Generation Time (CGT) is proportional to the size of the training set. The CGT at each stage of the present inventive method is improved by a factor of approximately 1/sampling rate (SR), if the training set is sub-sampled at a rate of SR. For example, if the training set consists of only 2% of the vectors within the datacube, the CGT is improved by a factor of approximately 50. For an iterative or recursive method such as the present invention, the speed improvement is very significant since numerous codebooks are generated in the vector quantisation of a single datacube.

The overall processing time of the present algorithm with sub-sampling is comparable to the fastest Multiple Sub-Codebook Algorithm (MSCA). The processing times are similar. Since for both algorithms the codebook generation time decreases when the training set size and the codebook size are reduced this is expected. Further, the coding time is reduced when the codebook size is decreased. The distinguishing feature of the present invention is a resulting improved fidelity, improved compression ratio, and an ability to selectively trade-off between these two measures of performance either prior to processing or from the compressed data.

Of course, the present invention will also function with any of a variety of methods of codebook generation such as the LBG method, the Spectral Feature Based Binary Coding method, and MSCA.

Also, during an encoding step, the SFBBC method and the Correlation Vector Quantization (CVQ) method are suitable alternatives to the LBG algorithm. When using MSCA, it is suitable for replacing both the codebook generation and the encoding steps.

Selection of codebook generation techniques and of encoding techniques within the framework of the inventive method is a matter for one skilled in the art based on design parameters relating to system performance and based on their available working program code. For example, someone with working code for performing MSCA may choose to use MSCA for both steps to obviate a need to further develop encoding and codebook selection code, thereby speeding up time to market. Of course, numerous parameters effect selection of techniques within the inventive method. This is evident to those of skill in the art.

According to an embodiment of the invention a fixed fidelity is provided at an outset of the compression process. For example, the fidelity is provided as a signal to noise ratio. The compression process them proceeds through a sufficient number of stages until the reconstruction fidelity reaches the predetermined fixed fidelity. In one embodiment the algorithm adaptively selects the codebook size at each approximate stage to yield a best compression ratio and fastest processing time. This mode has been examined and demonstrated on 8 hyperspectral test data sets. Alternatively, a same codebook size is used for each stage.

Lossy compression can be treated as lossless or near-lossless compression from the point of view of applications, if the level of noise (error) introduced by a lossy compressor is smaller than that of the intrinsic noise of the original data. In using the Fixed Fidelity mode, one can implement near lossless compression by setting the value of the fidelity threshold to be slightly less than the signal-to-noise ratio of the original data. Of course, in transmitting the data, only an amount of data with a desired fidelity need be transmitted to allow reconstruction of the data with that fidelity. This provides flexibility with approximately lossless data storage.

In another embodiment, an operating mode called Asymptotic Compression Ratio Estimation is provided. A graph of fidelity versus compression ratio, which is related to the number of approximation stages and codebook size at each stage, statistically reaches an asymptote. Despite an increasing number of approximation stages, after a certain number of stages the reconstruction fidelity ceases to increase as the compression ratio decreases. This point, which is referred to as an inflection point of the graph is detected, and compression proceeds automatically stage by stage until the inflection point is detected. In addition the process adaptively selects codebook size at each stage to yield a best compression ratio and fastest processing time. This mode has been examined and demonstrated on 8 hyperspectral test data sets. Alternatively, after a number of stages the compression ration decreases while the fidelity improves only nominally defining the inflection point. Clearly, using such a process allows for a careful balance between compression ratio and fidelity.

In an embodiment in the process of providing a fixed fidelity and/or in the process of detecting the inflection point, the fidelity of each spectral band is analysed rather than the fidelity of the overall spectral bands. If a spectral band is detected whose fidelity has reached the desirable fidelity or the inflexion point, the process of coding to reach a predetermined fidelity and/or the process of automatic detection of the inflection point operate on a set of codevectors excluding this spectral band. This process guarantees that the fidelity of the reconstructed data is better than the predetermined fidelity in each spectral band. Due to the fact that the convergence rate of each band to the predetermined fidelity is different, the bands whose convergence rate is fast are excluded from processing of further iterations, which will include those bands whose convergence rate is slower. This saves processing time for both codebook generation and encoding. For automatic detection of the inflection point, this process produces an inflection point for each spectral band, and continues to iterate on spectral bands whose inflexion points have not been detected. An overall inflection point is obtained by averaging the inflection points at each spectral band. Besides saving processing time for both codebook generation and coding, this process produces a higher compression ratio compared to the ordinary method which verifies the fidelity of the overall spectral bands. This is evident since it avoids further iterations on spectral bands whose inflection points have been reached—whose fidelity is not improving through iteration.

For example, when inflection points are detected for half of the bands, the compression process is iterating on half of the total number of bands. As such, there are fewer vectors and compression time is reduced and/or compression quality per iteration is improved.

Of course, numerous other embodiments may be envisaged without departing from the spirit and scope of the claimed invention.

What is claimed is:

1. A method for encoding image data using vector quantisation, wherein the encoded image data is compressed data, the method comprising the steps of:
   a) determining a first codebook having a plurality of codevectors;
   b) encoding each image vector of the image data by determining a codevector within the first codebook that approximates the image vector within the image data;
   c) creating a first index map by storing associated with each of the image vectors an index indicative of the codevector's location within the first codebook;
   d) determining difference data based on the original image data and the encoded image data; and,
   e) repeating the steps of:
      e1) determining another codebook;
      e2) encoding each error vector of the difference data by determining a codevector within the other codebook that approximates the error vector within the difference data;
      e3) creating another index map by storing associated with each of the error vectors an index indicative of the codevector's location within the other codebook; and,
      e4) determining new difference data based on difference data and the encoded difference data;
   until a control error of the difference data is smaller than a given threshold.

2. A method for encoding image data using vector quantisation as defined in claim 1, wherein step a) comprises the steps of sampling a small subset of vectors within the image data and determining a set of codevectors for reasonably approximating the sampled vectors.

3. A method for encoding image data using vector quantisation as defined in claim 2, wherein sampling is performed on a small percentage of vectors within the image data.

4. A method for encoding image data using vector quantisation as defined in claim 1, wherein step e1) comprises the steps of sampling a small subset of error vectors within the difference data and determining a set of codevectors for reasonably approximating the sampled vectors.

5. A method for encoding image data using vector quantisation as defined in claim 1, wherein step d) comprises the step of decoding the encoded image data and wherein the difference data are determined as a difference between the original image data and the decoded image data.

6. A method for encoding image data using vector quantisation as defined in claim 1, wherein step d) comprises the step of subtracting one of an original image vector and a codevector associated with the image vector by the associated index value from the other.

7. A method for encoding image data using vector quantisation as defined in claim 1, wherein a compression ratio of the encoding is controlled by the size of the codebook at each approximation stage comprising steps (e1) to (e4).

8. A method for encoding image data using vector quantisation as defined in claim 7, wherein a codebook size is varied between iterations.

9. A method for encoding image data using vector quantisation as defined in claim 1, wherein a compression ratio of the encoding is controlled by the number of approximation stages, wherein each approximation stage comprises steps (e1) to (e4).

10. A method for encoding image data using vector quantisation as defined in claim 1, wherein fidelity of the encoded image data is controlled by the size of the codebook at each approximation stage comprising steps (e1) to (e4).

11. A method for encoding image data using vector quantisation as defined in claim 10, wherein a codebook size is varied between iterations.

12. A method for encoding image data using vector quantisation as defined in claim 1, wherein fidelity of the encoded image data is controlled by the number of approximation stages, each approximation stage comprising steps e1) to e4).

13. A method for encoding image data using vector quantisation as defined in claim 1, comprising the steps of:
   combining the first codebook and the other codebooks into a single codebook; and,
   combining the first index map and the other index maps into a single index map.

14. A method for encoding image data using vector quantisation as defined in claim 13, wherein the combined single index map is constructed by concatenating the indices indicating a same location in the index maps.

15. A method for encoding image data using vector quantisation as defined in claim 1, wherein image information is encoded in dependence upon its significance such that most significant image information is encoded first.

16. A method for encoding image data using vector quantisation as defined in claim 1, wherein the codebooks and index maps are entropy encoded.

17. A method for encoding image data using vector quantisation as defined in claim 1, wherein the image data comprise a hyper-spectral datacube and wherein the number of codevectors in the first codebook is determined such that it is close to the number of real classes present in the image.

18. A method for encoding image data using vector quantisation as defined in claim 17, wherein the first index map provides spatial information and spectral classification information of the hyper-spectral datacube.

19. A method for encoding image data using vector quantisation as defined in claim 1, wherein at least one of steps (a) and (e1) are performed by at least one of the following: LBG, SFBBC, and MSCA.

20. A method for encoding image data using vector quantisation as defined in claim 19, wherein at least one of steps (b) and (e2) are performed by at least one of the following: CVQ, SFBBC, and MSCA.

21. A method for encoding image data using vector quantisation as defined in claim 1, wherein between each iteration a determination is made of an improvement in fidelity and wherein the method is halted when the improvement in fidelity of a single iteration is below a threshold improvement.

22. A method for encoding image data using vector quantisation as defined in claim 1, wherein between each iteration a determination is made of an improvement in fidelity for each spectrum and wherein spectra for which the improvement in fidelity of a single iteration is below a threshold improvement are excluded from a dataset for processing in subsequent iterations.

23. A method for encoding image data using vector quantisation as defined in claim 22, wherein spectra for which the improvement in fidelity of a single iteration is below a threshold improvement are determined based on a closeness of the error vector associated with the spectrum to the actual error spectrum.

24. A method for encoding image data using vector quantisation as defined in claim 1, wherein between each iteration a determination is made of a fidelity of the encoded data and wherein the method is halted when the fidelity of the encoded data is better than a predetermined fixed fidelity.

25. A method for encoding image data using vector quantisation as defined in claim 24, wherein the predetermined fixed fidelity is approximately a same level of fidelity as that provided by a transducer with which the spectra were sensed.

26. A method for encoding image data using vector quantisation as defined in claim 1, between each iteration a determination is made of a fidelity of the encoded data for each spectrum and wherein spectra for which the fidelity of the encoded data is better than a predetermined fixed fidelity are excluded from a dataset for processing in subsequent iterations.

27. A method for encoding image data using vector quantisation, wherein the encoded image data is compressed data, the method comprising the steps of:
   a) determining a first codebook having a plurality of codevectors;
   b) encoding each image vector of the image data by determining a codevector within the first codebook that approximates the image vector within the image data;
   c) creating a first index map by storing associated with each of the image vectors an index indicative of the codevector's location within the first codebook;
   d) determining difference data based on the original image data and the encoded image data; and,
   e) iterating the steps of:
      e1) determining another codebook;
      e2) encoding each error vector of the difference data by determining a codevector within the other codebook that approximates the error vector within the difference data;
      e3) creating another index map by storing associated with each of the error vectors an index indicative of the codevector's location within the other codebook; and,
      e4) determining new difference data based on the difference data and the encoded difference data;
   until a predetermined number of iterations are completed.

28. A method for encoding image data using vector quantisation as defined in claim 27, wherein step a) comprises the steps of sampling a small subset of vectors within the image data and determining a set of codevectors for reasonably approximating the sampled vectors.

29. A method for encoding image data using vector quantisation as defined in claim 28, wherein sampling is performed on a small percentage of vectors within the image data.

30. A method for encoding image data using vector quantisation as defined in claim 27, wherein step e1) comprises the steps of sampling a small subset of error vectors within the difference data and determining a set of codevectors for reasonably approximating the sampled vectors.

31. A method for transmitting encoded image data via a communications network, wherein the encoded image data is compressed data, the method comprising the steps of:
   a) receiving from a first station connected to the communications network first data indicative of a first codebook and a first index map;
   b) transmitting the first data via the communications network from the first station to a second station; and,
   c) repeating the steps of:
      c1) receiving data indicative of a consecutive codebook and a consecutive index map; and,
      c2) transmitting the data via the communications network from the first station to the second station;
   until a fidelity of an image reconstructed from the transmitted data at the second station is above a predetermined threshold or until all codebooks and all index maps of the encoded image data have been transmitted.

32. A method for transmitting encoded image data via a communications network as defined in claim 31, wherein image information is transmitted in dependence upon its significance such that most significant image information is transmitted first.

33. A method for transmitting encoded image data via a communications network as defined in claim 31, wherein the communications network comprises a wireless communications network.

34. A method for transmitting encoded image data via a communications network as defined in claim 31, wherein the communications network comprises the Internet.

35. A method for decoding encoded image data, wherein the encoded image data is compressed data, the method comprising the steps of:
   a) decoding each encoded image vector of the image data using a first codebook and a first index map;
   b) reconstructing first image data based on the decoded image vectors; and,
   c) repeating the steps of:
      c1) decoding each encoded error vector of consecutive difference data using a consecutive codebook and a consecutive index map; and,
      c2) reconstructing image data based on the first image data and the decoded error vectors of consecutive difference data;
   until a fidelity of the reconstructed image data is above a predetermined threshold or until all codebooks and all index maps of the encoded image data have been decoded.

36. A method for decoding encoded image data as defined in claim 35, wherein the threshold for the fidelity of the reconstructed image data is smaller than the threshold for the fidelity of the encoded image data.

37. A method for decoding encoded image data as defined in claim 35, wherein image information is reconstructed in dependence upon its significance such that most significant image information is reconstructed first.

38. A system for encoding image data using vector quantisation, wherein the encoded image data is compressed data, the system comprising:
   a first port for receiving the image data;
   a processor for:
      a) determining a first codebook having a plurality of codevectors;
      b) encoding each image vector of the image data by determining a codevector within the first codebook that approximates the image vector within the image data;
      c) creating a first index map by storing associated with the image vectors an index indicative of the codevector's location within the first codebook;
      d) determining difference data based on the original image data and the encoded image data; and, e) repeating the steps of:
  e1) determining another codebook;
  e2) encoding each error vector of the difference data by determining a codevector within the other codebook that approximates the error vector within the difference data;
  e3) creating another index map by storing associated with the error vectors an index indicative of the codevector's location within the other codebook; and,
  e4) determining new difference data based on the difference and the encoded difference data;
until a control error of the difference data is smaller than a given threshold; memory for storing data during execution of steps a) to e4); and, a second port for providing the encoded image data.

39. A system for encoding image data using vector quantisation as defined in claim 38, wherein the image data are encoded in real time.

40. A system for encoding image data using vector quantisation as defined in claim 38, wherein image information is encoded in dependence upon its significance such that most significant image information is encoded first.

41. A system for decoding encoded image data, wherein the encoded image data is compressed data, the system comprising:
  a first port for receiving the encoded image data;
  a processor for:
    a) decoding each encoded image vector of the image data using a first codebook and a first index map;
    b) reconstructing first image data based on the decoded image vectors; and,
    c) repeating the steps of:
      c1) decoding each encoded error vector of consecutive difference data using a consecutive codebook and a consecutive index map; and,
      c2) reconstructing image data based on the first image data and the decoded error vectors of consecutive difference data;
    until a fidelity of the reconstructed image data is above a predetermined threshold or until all codebooks and all index maps of the encoded image data have been decoded;
  memory for storing data during execution of steps a) to c2); and, a second port for providing the decoded image data.

42. A system for decoding encoded image data as defined in claim 41, wherein the image data are decoded in real time.

43. A system for decoding encoded image data as defined in claim 41, wherein image information is received in dependence upon its significance such that most significant image information is received first.

44. A system for decoding encoded image data as defined in claim 41, wherein image information is reconstructed in dependence upon its significance such that most significant image information is reconstructed first.

45. A system for decoding encoded image data as defined in claim 41, wherein the threshold for the fidelity of the reconstructed image data is smaller than the threshold for the fidelity of the encoded image data.

* * * * *

UNITED STATES PATENT AND TRADEMARK OFFICE
CERTIFICATE OF CORRECTION

PATENT NO. : 6,701,021 B1
DATED : March 2, 2004
INVENTOR(S) : Qian et al.

It is certified that error appears in the above-identified patent and that said Letters Patent is hereby corrected as shown below:

Column 6,
Lines 60-64, the formula should read as follows:

$$Cr = \frac{N_r \cdot N_c \cdot N_b \cdot Len}{\sum_{m=1}^{M}(N_m \cdot N_b \cdot Len + N_r \cdot N_c \cdot \log_2 N_m)},$$

Column 7,
Line 28, "Therefor," should read -- Therefore, --

Signed and Sealed this

Seventh Day of September, 2004

JON W. DUDAS
*Director of the United States Patent and Trademark Office*